(12) United States Patent
Wilhelm

(10) Patent No.: US 6,921,477 B2
(45) Date of Patent: Jul. 26, 2005

(54) GROUNDWATER TREATMENT SYSTEM AND METHOD

(76) Inventor: Steven L. Wilhelm, 6467 NW. Sumac, Corvallis, OR (US) 97330

( * ) Notice: Subject to any disclaimer, the term of this patent is extended or adjusted under 35 U.S.C. 154(b) by 10 days.

(21) Appl. No.: 10/406,729

(22) Filed: Apr. 2, 2003

(65) Prior Publication Data

US 2003/0189010 A1 Oct. 9, 2003

Related U.S. Application Data

(60) Provisional application No. 60/371,005, filed on Apr. 8, 2002.

(51) Int. Cl.⁷ .................................................. C02F 1/58
(52) U.S. Cl. ........................ 210/170; 210/281; 210/284; 210/287; 166/265; 166/306; 405/128.5; 405/129.25
(58) Field of Search ................................ 210/170, 281, 210/284, 287, 694, 747; 166/68, 265, 306; 405/128.45, 128.5, 128.7, 128.75, 129.2, 129.25

(56) References Cited

U.S. PATENT DOCUMENTS

| | | |
|---|---|---|
| 5,082,053 A | 1/1992 | Bernhardt |
| 5,143,606 A | 9/1992 | Bernhardt |
| 5,171,104 A | 12/1992 | Bernhardt |
| 5,180,503 A | 1/1993 | Gorelick et al. |
| 5,281,333 A | 1/1994 | Bernhardt |
| 5,380,126 A | 1/1995 | Bernhardt |
| 5,389,267 A | 2/1995 | Gorelick et al. |
| 5,402,848 A | 4/1995 | Kelly |
| 5,403,491 A * | 4/1995 | Holland ...................... 210/747 |
| 5,426,598 A | 6/1995 | Hagihara |
| 5,547,589 A | 8/1996 | Carroll, II |
| 5,622,450 A | 4/1997 | Grant, Jr. |
| 5,855,775 A | 1/1999 | Kerfoot |
| 5,879,108 A | 3/1999 | Haddad |
| 5,910,245 A | 6/1999 | Bernhardt et al. |
| 5,944,999 A | 8/1999 | Chancellor et al. |
| 6,174,108 B1 | 1/2001 | Suthersan |
| 6,312,605 B1 | 11/2001 | Kerfoot |
| 6,533,499 B2 | 3/2003 | Breeding |

OTHER PUBLICATIONS

B. Herrling, J. Stamm, W. Buermann, *Hydraulic Circulation System for In Situ Bioremdiation and/or In Situ Remediation of Strippable Contamination*, in *In–Situ Bioreclamation: Applications and Investigations for Hydrocarbon and Contaminated Site Remediation*, 173 (1991).

* cited by examiner

Primary Examiner—Christopher Upton
(74) Attorney, Agent, or Firm—Kolisch Hartwell, P.C.

(57) ABSTRACT

A groundwater treatment system, which includes subterranean inlet, treatment, and outlet portions. The inlet portion is configured to collect groundwater from an aquifer. The treatment portion includes a replaceable treatment media and is configured to receive the groundwater from the inlet portion and expose the groundwater to the treatment media. The outlet portion is configured to receive groundwater from the treatment portion and expel the groundwater to the aquifer.

43 Claims, 4 Drawing Sheets

US 6,921,477 B2

GROUNDWATER TREATMENT SYSTEM AND METHOD

CROSS-REFERENCE TO RELATED APPLICATIONS

This application claims priority from the following co-pending provisional patent application, the content of which is incorporated by reference: IN SITU WATER TREATMENT SYSTEM, Ser. No. 60/371,005, filed Apr. 8, 2002.

BACKGROUND

Groundwater is often contaminated with undesirable compounds. The contamination typically is the result of waste leaking or leaching into below-ground aquifers. Although many contaminants in water can be removed by passing the water through granular activated carbon, groundwater is generally not treated in this way, because known methods require the groundwater to be pumped above ground level. In many locations, regulations prohibit groundwater that is removed from the aquifer from being re-injected into the aquifer. Thus, water pumped to the surface is lost for groundwater use and becomes a disposal problem.

In situ methods of treating groundwater do not move the water from the aquifer above ground level. The groundwater is treated below ground level, and once treated, remains in the aquifer. One in situ approach that has been suggested involves filling the annular space between the screened portion of a well casing and the well's borehole with granular activated carbon. In this way, the groundwater could flow through the carbon when entering or exiting the well. However, this approach may be impractical. The carbon would effectively be acting as a gravel pack, replacing sand that would normally be placed between the screen and the borehole. This limits the composition of carbon that could be used. Furthermore, once exhausted, the carbon could not easily be replaced with charged carbon. If the carbon was removed, the borehole would almost certainly collapse, making it impractical to place fresh carbon around the well.

Another in situ method of treating groundwater involves using air to strip contaminants from the water. The water is not removed from the aquifer; only the air stream with the contaminants is brought to the surface. The air stream may then be treated to remove the contaminants stripped from the groundwater. Once the air is treated, it may be re-used to remove more contaminants from the groundwater, or released to the atmosphere. Alternatively, the air stream may be released to the atmosphere without treatment. Injection of air may disturb the chemical equilibrium in the groundwater, thus fouling the well with various precipitates and/or biological growths, including iron, manganese, calciferous solids, and iron-fouling bacteria.

SUMMARY

A groundwater treatment system is provided, which includes subterranean inlet, treatment, and outlet portions. The inlet portion is configured to collect groundwater from an aquifer. The treatment portion includes a replaceable treatment media and is configured to receive the groundwater from the inlet portion and expose the groundwater to the treatment media. The outlet portion is configured to receive groundwater from the treatment portion and expel the groundwater to the aquifer.

DETAILED DESCRIPTION AND BEST MODE

Figure 1:
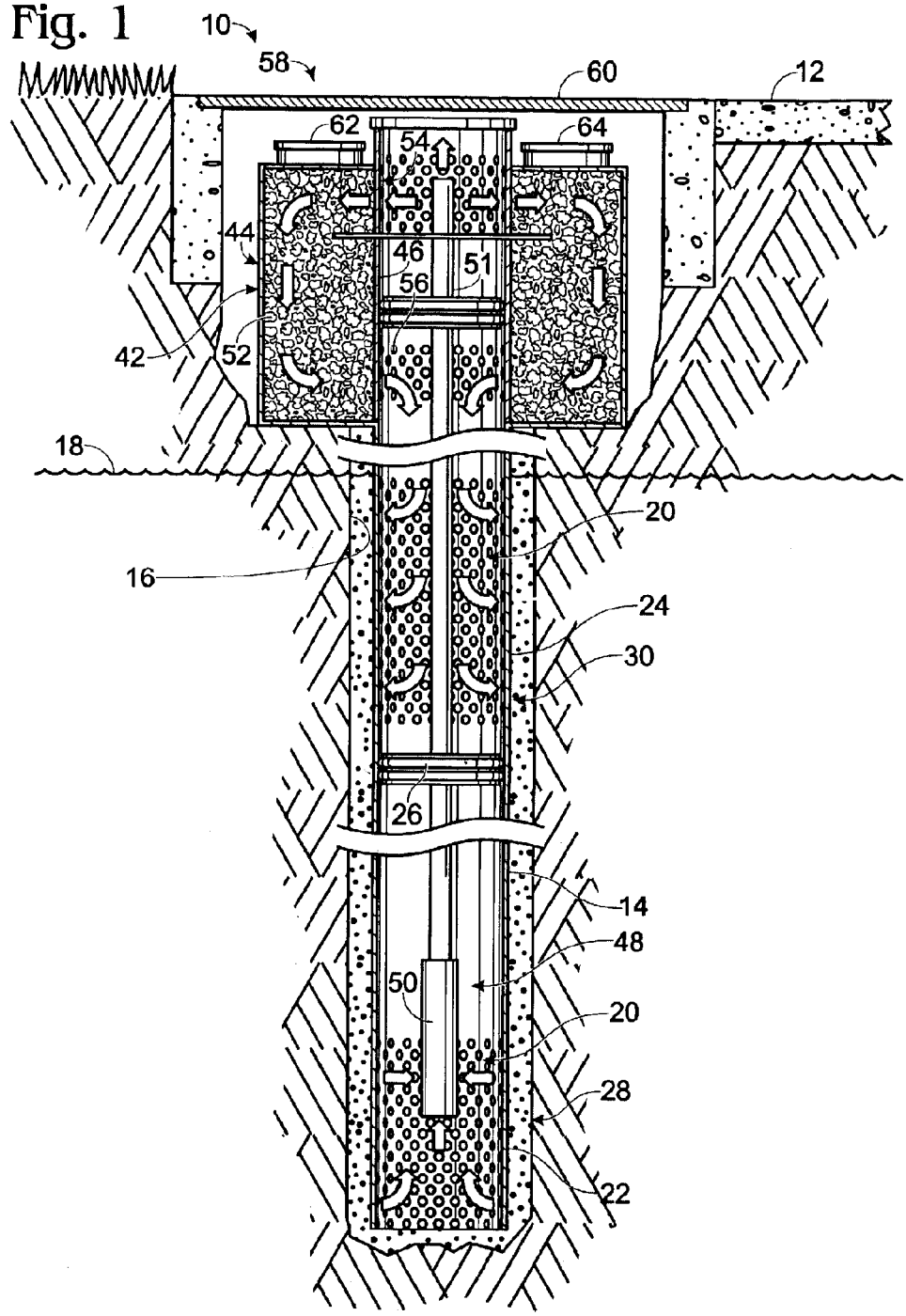
FIG. 1 is a cross section view of an in situ groundwater treatment system for subterraneanly treating contaminated groundwater.

FIG. 1 schematically shows a subterranean groundwater treatment system 10 capable of reducing groundwater contamination without moving the groundwater above a ground level 12. Groundwater treatment system 10 includes a well casing 14 placed into a borehole 16 formed below ground level and extending below a groundwater level 18. The well casing may be sized to adequately service a particular location. Locations with deeper groundwater levels typically benefit from wells with relatively longer well casings, and locations with relatively high groundwater flow rates may benefit from well casings with larger diameters capable of treating more groundwater per unit time. The diameter of the portion of the well casing extending below the groundwater level typically is sized between approximately two inches and approximately sixteen inches, although narrower and wider casings are within the scope of this disclosure. The ability to use casings under eight inches, and particularly casings between two and eight inches, provides an advantage over air stripping wells, which typically require wider casings to efficiently air strip contaminants. Casing lengths are often less than three-hundred feet, although longer casings may be used to treat contaminated groundwater that is deeper below ground level. Well casings may be constructed from polyvinyl chloride, stainless steel, and/or other suitable materials.

Well casing 14 includes screens 20, which are intervals that allow water to enter or exit the well casing. The screens facilitate the transfer of groundwater between groundwater treatment system 10 and the surrounding aquifer. The screens, which are illustrated schematically in the drawings, are typically slots or other openings that are cut or otherwise formed into the sidewalls of the well casing. In some embodiments, screens may take the form of a wire wrapped around support rods of the well casing. The wire helix may be wrapped so that the spacing between adjacent wire segments corresponds to a desired flow rate and/or level of filtration. For example, wider spacing generally corresponds to greater flow rates, while narrower spacing generally corresponds to increased filtration.

Figure 2:
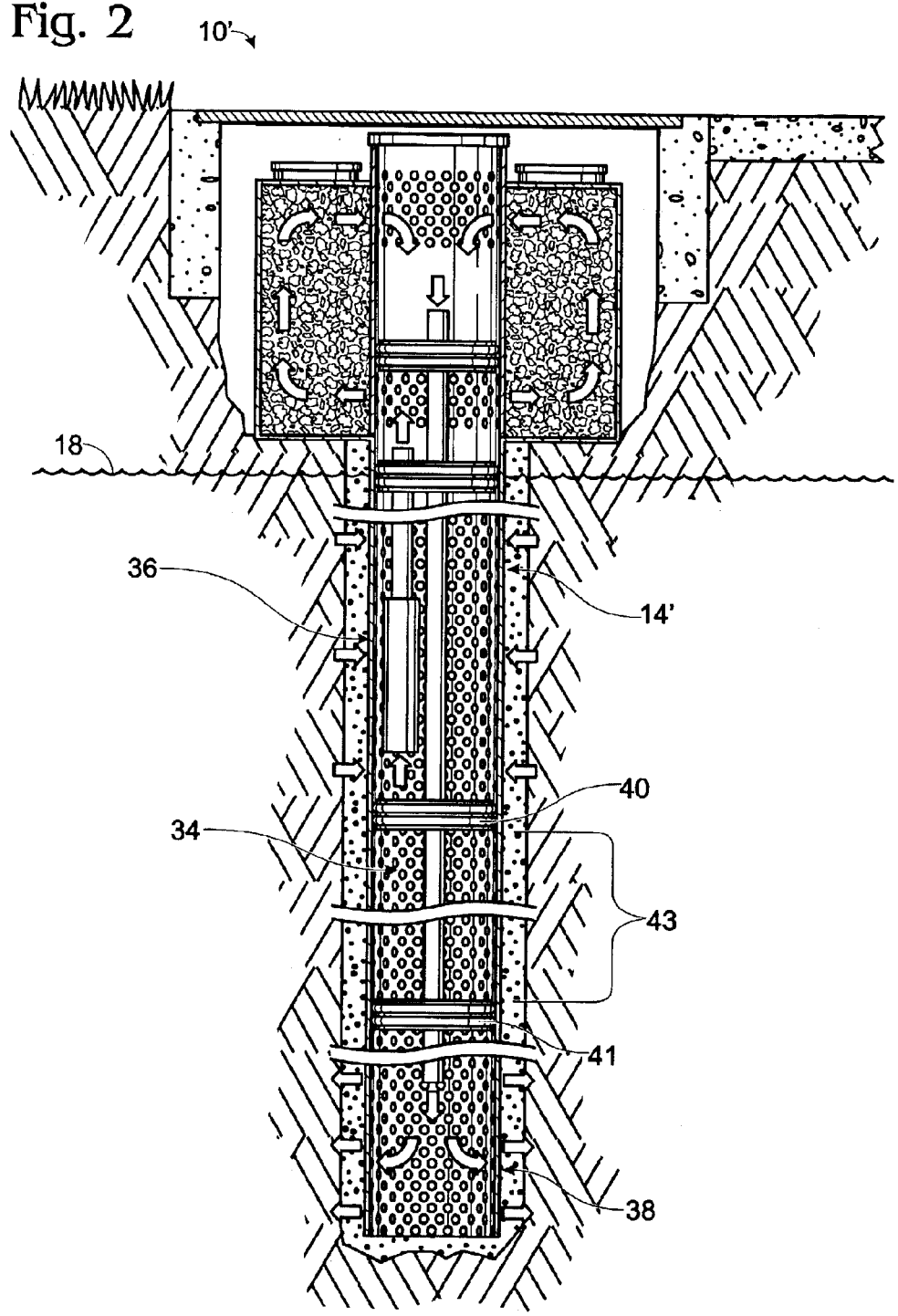
FIG. 2 is a cross section view of another configuration of the in situ groundwater treatment system of FIG. 1.

Well casings may include one or more screens depending on the precise configuration of a particular embodiment. When more than one screen is used, at least one of the screens may serve as an inlet screen for collecting groundwater, and at least one of the screens may serve as an outlet screen for returning groundwater to the aquifer. FIG. 1 shows such an arrangement, in which casing 14 includes an inlet screen 22 and an outlet screen 24, between which a packer 26 is positioned, establishing an inlet portion 28 and an outlet portion 30. Systems employing a single screen may include a packer, which effectively divides the screen into an inlet screen portion and an outlet screen portion. For example, FIG. 2 shows another embodiment of a groundwater treatment system 10', in which a well casing 14' includes a single screen 34 divided into an inlet portion 36 and an outlet portion 38 by packers 40 and 41. The examples illustrated in FIGS. 1 and 2 are provided for the purpose of explanation, and it should be understood that other arrangements are within the scope of this disclosure.

A well may be tuned to service a particular site based on actual aquifer response. The relative depths from which water is drawn into and released from a well casing may be established by positioning the inlet and outlet screens and/or moving one or more packers to establish the relative size and location of the inlet and outlet portions. Two or more packers, such as packers 40 and 41, may be set to bound a dead portion of the well casing, such as dead portion 43 of FIG. 2, which is not used for either water intake or expulsion, or is at least not in fluid communication with the subsequently described treatment portion. Through the use of screen placement, packer placement, and the plumbing set up between the various well portions, one or more inlet portions, outlet portions, and/or dead portions may be established in virtually any sequence along the well casing. For example, as demonstrated by FIGS. 1 and 2, the inlet portion of the groundwater treatment system may be positioned above (FIG. 2) or below (FIG. 1) the outlet portion. Furthermore, the depth of the boundaries of adjoining portions may be controlled. In addition, the well may be further tuned by adjusting the flow rate of a pumping subsystem, which is described below. Therefore, the well may be set up to better complement a particular aquifer, thus increasing its treatment effectiveness.

As can be seen in FIG. 1, well casing 14 varies in width along its length, with a top portion 42 of the casing having a relatively large diameter compared to the diameter of the lower well casing. Top portion 42 may be sized to accommodate a treatment portion 44, which is described in more detail below. A top portion diameter ranging from twelve inches to seventy-two inches is suitable for most embodiments. Smaller or larger diameters are also within the scope of this disclosure. Furthermore, in some embodiments, the top portion may not have a larger diameter for receiving a treatment portion, because the treatment portion may be positioned in another location, such as in a position flanking the well casing. Such a flanking arrangement may be useful because a relatively large amount of treatment media may be placed in such an arrangement. Furthermore, a treatment portion flanking more than one well may be used to service plural surrounding wells. In any case, such a flanking treatment portion may be positioned below ground, and may be integrally sealed with the rest of the treatment system, so that groundwater treated by such a periphery treatment portion remains in a sealed system throughout treatment.

Well casing 14 laterally defines the outer edge of each of inlet portion 28, outlet portion 30, and treatment portion 44. As described above, the treatment portion may have a relatively large diameter compared to the inlet portion or the outlet portion. Other deviations in casing diameter may also be established. Regardless of the diameter of a particular portion of the well casing, the well casing usually has generally circular horizontal cross sections. However, oval, polygonal, rectilinear, and/or other cross sectional geometries are also within the scope of this disclosure.

Figure 3:
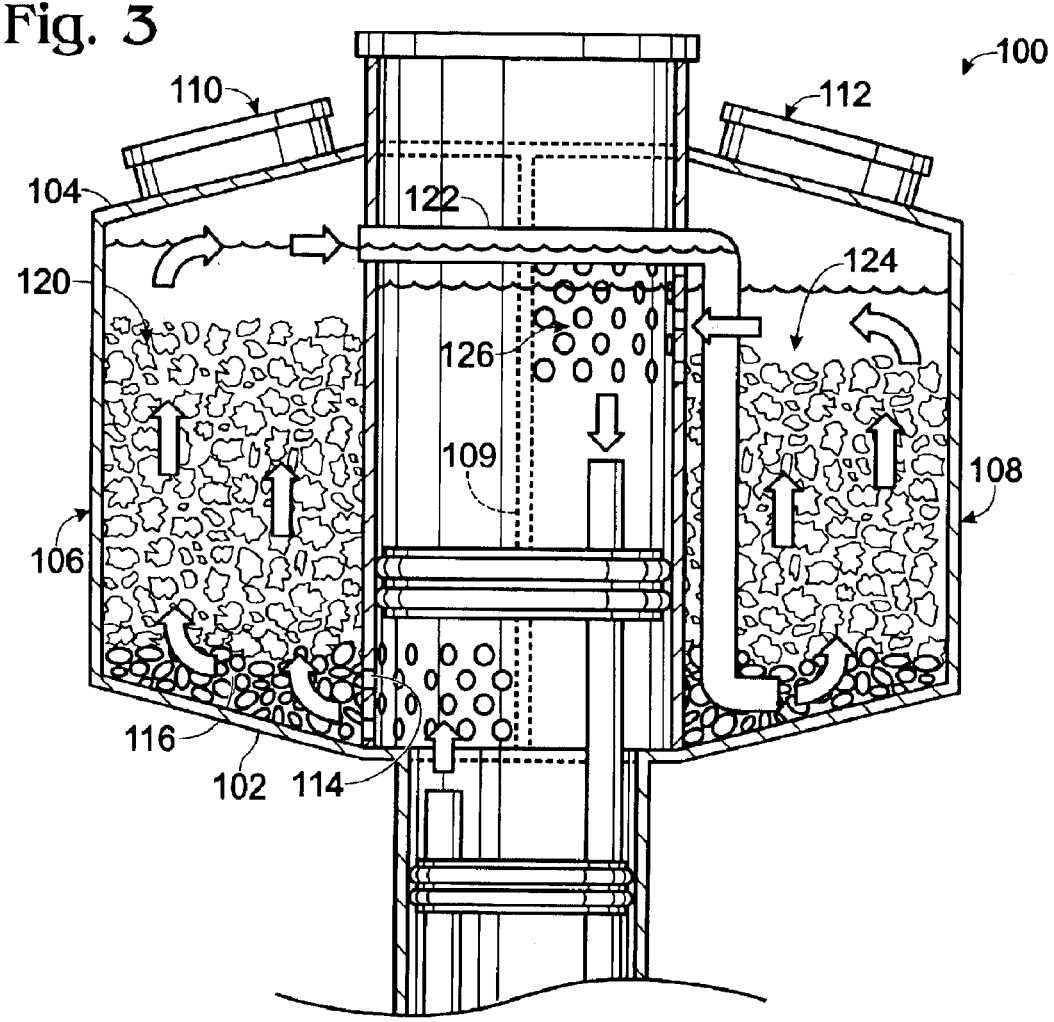
FIG. 3 is a cross section view showing an embodiment of a treatment portion compatible with the groundwater treatment system of FIGS. 1 and 2.

While treatment portion 44 of FIG. 1 is laterally defined on the outside by the top portion of the well casing, an inner conduit 46 is present at an inside region of the treatment portion. The well casing and the inner conduit may be a monolithic structure, or the inner conduit may be a separate component that may be selectively positioned within the treatment portion. In FIG. 1, inner conduit 46 is concentrically aligned with well casing 14, and is the same diameter as the lower portion of the well casing. However, in other embodiments, the inner conduit may be differently sized relative to the well casing. For example, as shown in FIG. 3, the inner conduit may have a larger diameter than the lower portion of the well casing. The inner conduit may facilitate holding treatment media in the treatment portion of the well, and may include screens through which the water may enter and exit the treatment portion of the well. In this manner, treatment media may be contained within the treatment portion and at least substantially prevented from moving to other portions of the treatment system. Thus, the treatment media may be easily replaced, as described below.

Groundwater treatment system 10 includes a pumping subsystem 48 that moves groundwater from inlet portion 28 to treatment portion 44. The pumping subsystem may be configured to move groundwater via applied pressure through the treatment media, to the outlet portion, and into the aquifer. In this manner, the pumping system may control the relative pressures at various locations throughout the groundwater treatment system to encourage groundwater to travel through the treatment path of the system. In particular, water at the outlet portion of the well may be over-pressured, or pressured to a level greater than the aquifer. Thus, water at the outlet portion may be forced back into the aquifer at an increased rate. The ability to over-pressure water at the outlet portion of the system provides increased flexibility in tuning a well to a particular treatment site. Pumping subsystem 48 includes a submersible pump 50. As shown, the pumping subsystem also includes an inlet fluid path, or pipe, 51 for directing fluid from pump 50 to treatment portion 44.

Depending on the particular arrangement of treatment, inlet, and outlet portions, groundwater treatment systems according to the present disclosure may include additional and/or alternative plumbing for moving groundwater from one location to another. As exemplified by pump 50 and fluid path 51, the plumbing may be positioned within the well casing. Such internal positioning of the plumbing may reduce the difficulty and cost of installing and maintaining a groundwater treatment system. Because all of the plumbing, and other components, may be internalized within the well casing, the entire system may be fit into a borehole without requiring any lateral digging and/or trenching.

The pumping capacity of the pumps may be selected according to the desired flow rate, well depth, amount of treatment media, lateral extent of the treatment zone around the well, etc. Such pumping parameters may be calculated as described in the following article, the contents of which are incorporated by reference: B. Herrling, J. Stamm, W. Buermann, *Hydraulic Circulation System for In Situ Bioremediation and/or In Situ Remediation of Strippable Contamination*, in *In-Situ Bioreclamation: Applications and Investigations for Hydrocarbon and Contaminated Site Remediation* 173 (1991). However, other flow rates may be preferable; for example, flow rates lower than suggested by Herrling et al. may increase the effectiveness of groundwater treatment according to the present disclosure.

Treatment portion 44 includes treatment media 52, which is used to reduce contamination of groundwater. The treatment portion of groundwater treatment systems within the scope of this disclosure may be charged with one or more different types of treatment media, which may be suited for removing various types of contamination. Because the configuration of the disclosed groundwater treatment systems facilitates the replacement of exhausted treatment media with fresh, or at least less exhausted, treatment media, a treatment system may effectively service an area for a much longer period of time than the treatment life of one charge of treatment media. Furthermore, the types and/or amounts of treatment media employed at a given well may be conveniently changed to customize groundwater treatment. Thus, the groundwater treatment systems are highly effective, versatile, and have a relatively long life span.

Treatment media 52 typically includes adsorptive and/or reactive media, which is selected to reduce one or more contaminants from groundwater. An example of an adsorptive media, which has proven particularly effective at treating a wide variety of contaminants is carbon, such as granular activated carbon. However, virtually any adsorptive and/or reactive media may be utilized. In fact, because of the customizable configuration of the treatment portion, virtually any treatment media capable of treating groundwater when groundwater passes through or by the media may be used. Similarly, two or more different types of treatment media may be used in the same system to increase treatment effectiveness.

Treatment media may be used to treat volatile organic compounds, semi-volatile contaminants, metals, ionic contaminants, and explosives. Treatment media may also be used to treat contaminants that would otherwise need to be treated using expensive, complicated, or less effective methods. For example, the disclosed groundwater treatment systems may be used to treat contaminants that are mobilized with surfactants, contaminants that are treated with reactive barriers, and compounds that can be treated with catalyzed reactions. Some of these contaminants may not be effectively treated using prior art in situ methods, such as air stripping. The below table illustrates some of the contaminants that may be treated along with some of the treatment media that may be used to treat such contaminants. It should be understood that the contaminants listed below are non-exclusive examples of treatable contaminants, and the listed treatment media are similarly nonexclusive examples of media that may be used to treat such contaminants.

| Contaminant | Treatment Media |
| --- | --- |
| benzene, toluene, ethylbenzene, and/or xylene (BTEX), trichloroethene (TCE), tetrachloroethene (PCE), 1,1,1 trichloroethane, and carbon tetrachloride | carbon, ozone |
| naphthalene, methyl tertiary-butyl ether (MTBE), and methyl ethyl ketone (MEK) | carbon |
| lead, chromium, cadmium, selenium, and mercury | ion-exchange resins, minerals such as apatite |
| arsenic, nitrate, sulfate, and perchlorate | ion-exchange resins, reducing medium such as composted manure |
| Hexahydro-1,3,5-trinitro-1,3,5-s-triazine (RDX) and Trinitrotoluene (TNT) | carbon, zero-valent iron, |
| PCE, coal, and tar contamination | surfactants, carbon |
| PCE, and TOE | iron filings |
| TCE, PCE, and other chlorinated compounds | palladium catalysis media, ultra-violet light |

As shown in FIG. 1, groundwater enters the well near the bottom of the well at screen 22. Pumping subsystem 48 directs the groundwater to treatment portion 44. In the illustrated embodiment, the groundwater is pumped near the top of inner conduit 46, where it is released into the treatment media through upper screens 54. Gravity causes the groundwater to travel through treatment media 52. In some embodiments, pumping subsystem 48 may further encourage passage of the groundwater through the treatment media, such as by establishing a pressure differential. In some embodiments, such as shown in FIG. 2, the pumping subsystem may be used to force the groundwater in an upward direction through the treatment media. In FIG. 1, treated groundwater leaves the treatment portion through lower screens 56, and flows downward to outlet portion 30, where it is expelled through outlet screen 24. Groundwater may be expelled due to the natural flow caused by gravity and/or via an applied pressure that increases the relative pressure within the treatment system compared to outside the treatment system.

In FIG. 2, groundwater enters the well near the top of the lower portion of the well via an inlet portion 36 of a screen 34. The water is pumped to the treatment portion of the well, where it fills the treatment portion of the well. The treated groundwater overflows the treatment portion of the well and moves to near the bottom of the well, where it is expelled through an outlet portion 38 of screen 34. FIGS. 1 and 2 illustrate nonlimiting examples of the plumbing configurations that may be implemented, and it should be understood that other arrangements are within the scope of this disclosure.

As is shown in FIGS. 1 and 2, groundwater is treated without being moved above ground level. Furthermore, groundwater treatment systems may be sealed, to further limit groundwater exposure to above ground elements. Such sealing may also facilitate establishing pressure differentials, such as an over-pressuring near an outlet portion, to better control groundwater flow. As shown in FIG. 1, the groundwater treatment system may be accessed by a manhole 58. In particular, treatment portion 44 may be easily accessed by moving manhole cover 60, which is positioned near ground level. Manhole cover 60 may be configured to be lifted off of the manhole, hinged away from the manhole, slid away from the manhole, or otherwise moved to gain access to the manhole and the treatment system. Manhole 58 is one example of a design that facilitates replacement of exhausted treatment media with fresh treatment media. In other embodiments, a different mechanism for accessing the treatment portion of the well may be utilized. As can be seen in FIGS. 1 and 2, manhole 58 has a minimal surface expression, while still providing adequate access to the treatment system. The entrance to the manhole, or manhole cover, may be substantially level with the ground surface, so that vehicles may pass over the treatment system. Therefore, the treatment system is suitable for use on roadways or other areas in which a system with a larger surface expression would not work. Furthermore, the disclosed treatment provides at most negligible appreciable sound at the surface. Therefore, such treatment systems provide uninvasive treatment of contaminated groundwater.

Treatment portion 44 includes seals 62 and 64, which may be selectively opened and closed to obtain access to treatment media 52. Seals 62 and 64 are schematically illustrated, and other sealing mechanisms may be used in other embodiments. Seals 62 and 64 may be opened so that exhausted treatment media may be replaced with fresh treatment media. The media may be replaced while the treatment portion of the groundwater treatment system remains below ground level. For example, the treatment portion may be unsealed and the treatment media may be removed by a suitable method, such as a high-powered vacuum. Fresh treatment media may then replace the exhausted media. As described above, the treatment portion may be located near ground level, and may be easily accessed via a manhole, or similar structure. Furthermore, the treatment media may be substantially confined within the treatment portion, so that most treatment media does not enter the lower, or any other, portion of the treatment system. Therefore, treatment media of the system may be referred to as replaceable treatment media, which may be exchanged by emptying and refilling the treatment portion.

Depending on the type or types of treatment media used to treat a particular location and the precise configuration of the treatment portion, treatment media may be loaded in a variety of ways. For example, treatment media may be packaged in cartridges that may be inserted into the treatment portion, or the treatment media may be placed into the treatment portion in the media's natural form. Because the treatment portion is laterally bound by the well casing, when the treatment media is removed, the well does not collapse.

FIG. 3 shows another treatment portion 100, which may be used to treat contaminated groundwater. The illustrated treatment portion may be incorporated into the systems shown in FIG. 1 or 2, or other suitable systems. Treatment portion 100 includes a shaped bottom 102 and a shaped top 104. Although shown with somewhat conical shapes, it should be understood that the tops and bottoms may be shaped as bowls or with other suitable geometries, including flat geometries. Treatment portion 100 includes a lead treatment segment 106, which occupies one side of treatment portion 100, and a lag treatment segment 108, occupying the other side of the treatment portion. The lead and lag portions may be separated by a generally vertical divider 109. The lead and lag portions may occupy about the same volume, or they may be differently sized relative to one another. Lead treatment segment 106 may be accessed by seal 110, while lag treatment segment 108 may be accessed by seal 112.

Treatment portion 100 includes a lower entrance 114, through which pumped groundwater may enter lead segment 106 from an inlet portion of a well. The lower entrance may include a screen, a one-way valve, a flow restrictor, or other suitable mechanism for receiving water from below. Shaped bottom 102 may be filled with a collection gravel 116, such as two to three inch drain rock, into which the groundwater may be pumped. As water is pumped through entrance 114, lead segment 106 may fill. The lead treatment segment includes a treatment media 120 for treating groundwater. Because the groundwater fills the lead segment from the bottom up, the treatment media will generally remain submerged, which is advantageous for some varieties of treatment media.

Near the top of the lead segment, an overflow fluid path 122 allows water from the lead segment to move into lag treatment segment 108. As in the lead segment, the lag treatment segment may include a collection gravel 116 in the shaped bottom. Lag treatment segment 108 may be filled with a treatment media 124, which may be of the same or a different variety as treatment media 120. As water moves into the lag portion, treatment media 124 further treats the water. Near the top of the lag portion, a return 126 provides a fluid path from treatment portion 100 to an outlet portion of the well. In other embodiments, additional treatment portions may be included, through which the groundwater may be directed before returning to the outlet portion of the well.

Figure 4:
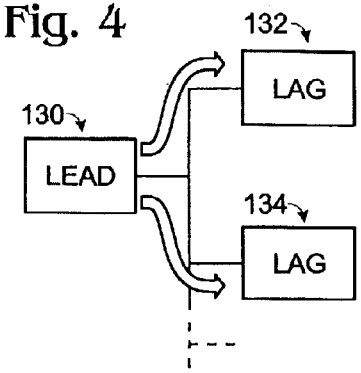
FIG. 4 schematically shows lag treatment portions connected in parallel to a lead treatment portion.
Figure 5:
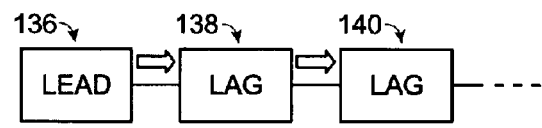
FIG. 5 schematically shows lag treatment portions connected in series to a lead treatment portion.

Plumbing may be established between two or more treatment portions so that the various portions receive groundwater in series, parallel, or a combination of series and parallel. As one example, FIG. 4 shows a lead treatment portion 130 receiving groundwater and passing, in parallel, the groundwater to lag portion 132 and lag portion 134. FIG. 5 shows an example of a series connection, in which a lead portion 136 passes groundwater to a lag portion 138, which in turn passes the groundwater to another lag portion 140. The above are provided as nonlimiting examples, and other arrangements may be used while remaining within the scope of this disclosure.

Figure 6:
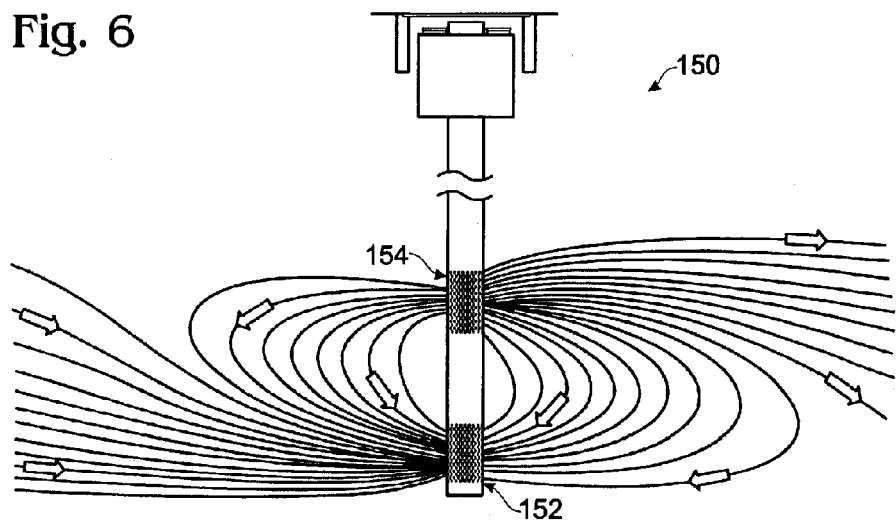
FIG. 6 is a flow diagram showing a theoretically perfect aquifer response to a groundwater treatment system according to the present disclosure.

FIG. 6 schematically shows a flow diagram of an exemplary recirculating treatment system 150. As can be seen, water is drawn from one level 152 of the aquifer and returned to another level 154 after treatment. The water moves outward from the well and then back in a recirculating pattern. The water also moves vertically through the aquifer under the influence of vertical gradients induced by the configuration of the inlet and outlet screens. Such vertical groundwater movement may increase the effectiveness of the treatment system, because the gradients may cause water from more areas of the aquifer to be brought to the well for treatment.

As herein described and illustrated, groundwater treatment systems may be self-contained treatment facilities capable of independently treating groundwater, although two or more treatment systems may be installed near one another to treat a larger area. The individual groundwater treatment systems may be designed with a relatively linear expression, so that the treatment system may be installed into a borehole. In other words, a straight borehole may be formed at a desired treatment location, and a treatment system may be placed into the borehole. Such an installation provides several advantages over the installation of more complicated treatment systems, which typically require lateral trenching away from the borehole and control stations above ground level. Using the disclosed treatment system, a manhole, or suitable entrance, may provide access to the treatment system without requiring any structure rising above ground level. Because of the substantially linear expression of the system, the manhole need not be substantially larger than the upper portion of the well.

Although the present disclosure has been provided with reference to the foregoing operational principles and embodiments, it will be apparent to those skilled in the art that various changes in form and detail may be made without departing from the spirit and scope defined in the appended claims. The present disclosure is intended to embrace all such alternatives, modifications and variances that fall within the scope of the appended claims. Where the disclosure or claims recite "a," "a first," or "another" element, or the equivalent thereof, they should be interpreted to include one or more such elements, neither requiring nor excluding two or more such elements.

What is claimed is:

1. A groundwater treatment system, comprising:
   a subterranean inlet portion configured to collect groundwater from an aquifer;
   a subterranean treatment portion including a replaceable treatment media and configured to receive the groundwater from the inlet portion and expose the groundwater to the treatment media; and
   a subterranean outlet portion configured to receive groundwater from the treatment portion and expel the groundwater to the aquifer;
   wherein the treatment portion is separate from and higher than the inlet and outlet portions and has a greater cross sectional area than the inlet and outlet portions, wherein above ground expression of the groundwater treatment system is limited to an access positioned substantially at ground level, and wherein the subterranean inlet portion, subterranean treatment portion, and subterranean outlet portion are collectively configured to be selectively sealed from atmosphere.

2. The groundwater treatment system of claim 1, wherein the treatment portion has a toroidal shape and is positioned above the inlet and outlet portions.

3. The groundwater treatment system of claim 2, wherein the treatment portion is concentrically aligned above the inlet and outlet portions.

4. The groundwater treatment system of claim 1, wherein the inlet portion, treatment portion, and outlet portion are laterally defined by a well casing.

5. The groundwater treatment system of claim 4, wherein the diameter of the well casing defining the treatment portion is greater than the diameter of the well casing defining the inlet portion or outlet portion.

6. The groundwater treatment system of claim 1, wherein the treatment includes a lead treatment segment and a lag treatment segment, wherein the lead treatment segment and the lag treatment segment are physically separated and in fluid communication with one another.

7. The groundwater treatment system of claim 6, wherein the lead treatment segment and the lag treatment segment are arranged at substantially the same level.

8. The groundwater treatment system of claim 1, wherein the treatment portion is configured to facilitate replacement of exhausted treatment media with other treatment media.

9. The groundwater treatment system of claim 8, wherein the treatment portion is positioned so that all of the treatment media is at most 10 feet below ground level.

10. The groundwater treatment system of claim 8, wherein the treatment portion is positioned so that all of the treatment media is at most 5 feet below ground level.

11. The groundwater treatment system of claim 1, wherein the access positioned substantially at ground level includes a manhole providing access to the treatment portion.

12. The groundwater treatment system of claim 1, wherein the treatment media includes an adsorbent solid.

13. The groundwater treatment system of claim 12, wherein the treatment media includes granular activated carbon.

14. The groundwater treatment system of claim 1, wherein the treatment media includes a reactive solid.

15. The groundwater treatment system of claim 1, wherein the groundwater treatment system is selectively sealable by seals located at the treatment portion so that groundwater collected by the inlet portion remains subterraneanly sealed within the groundwater treatment system until being expelled by the outlet portion.

16. The groundwater treatment system of claim 1, further comprising a pumping subsystem configured to move groundwater from the inlet portion to the treatment portion.

17. The groundwater treatment system of claim 16, wherein the pumping subsystem is configured to expel groundwater from the outlet portion via applied pressure.

18. The groundwater treatment system of claim 1, further comprising a return configured to move groundwater from the treatment portion to the outlet portion.

19. The groundwater treatment system of claim 1, further comprising a packer operationally separating the inlet portion and the outlet portion.

20. The groundwater treatment system of claim 19, wherein the inlet portion and outlet portion share a common screen that is operationally segmented by the packer.

21. The groundwater treatment system of claim 1, wherein the inlet portion is above the outlet portion.

22. The groundwater treatment system of claim 1, wherein the inlet portion is below the outlet portion.

23. The groundwater treatment system of claim 1, wherein no water is brought into the inlet portion or expelled from the outlet portion at a level as high as any of the treatment media.

24. A plural-stage groundwater treatment system, comprising:

a subterranean inlet portion configured to collect groundwater from an aquifer;

a treatment portion including a lead treatment segment configured to receive the groundwater from the inlet portion and a lag treatment segment configured to receive the groundwater from the lead treatment segment, wherein the lead treatment segment and the lag treatment segment each include replaceable treatment media for removing groundwater contamination; and a subterranean outlet portion configured to receive groundwater from the lag treatment segment and expel the groundwater to the aquifer;

wherein the treatment portion is separate from and higher than the inlet and outlet portions, and wherein the lead treatment segment and the lag treatment segment are arranged at substantially the same level.

25. The plural-stage groundwater treatment system of claim 24, further comprising a manhole providing access to the treatment portion.

26. The plural-stage groundwater treatment system of claim 24, wherein the groundwater treatment system is selectively sealable so that groundwater collected by the inlet portion remains subterraneanly sealed within the groundwater treatment system until being expelled by the outlet portion.

27. The plural-stage groundwater treatment system of claim 24, wherein the replaceable treatment media of the lead treatment segment is a different composition than the replaceable media of the lag treatment segment.

28. The plural-stage groundwater treatment system of claim 24, wherein the lag treatment segment is one of a plurality of lag treatment segments.

29. The plural-stage groundwater treatment system of claim 28, wherein the plurality of lag treatment segments receive the groundwater from the lead treatment segment in series.

30. The plural-stage groundwater treatment system of claim 28, wherein the plurality of lag treatment segments receive the groundwater from the lead treatment segment in parallel.

31. The plural-stage groundwater treatment system of claim 24, wherein the inlet portion and outlet portion are concentrically aligned below the treatment portion.

32. The plural-stage groundwater treatment system of claim 24, further comprising a pumping subsystem configured to over-pressure groundwater for expulsion through the outlet portion.

33. The groundwater treatment system of claim 24, wherein the treatment portion has a greater cross sectional area than the inlet and outlet portions.

34. The groundwater treatment system of claim 33, wherein the treatment portion has a toroidal shape and is positioned above the inlet and outlet portions.

35. The groundwater treatment system of claim 24, wherein the treatment media of at least one of the lead treatment segment and the lag treatment segment includes an adsorbent solid.

36. The groundwater treatment system of claim 24, wherein the treatment media of at least one of the lead treatment segment and the lag treatment segment includes granular activated carbon.

37. The groundwater treatment system of claim 24, wherein the treatment media of at least one of the lead treatment segment and the lag treatment segment includes a reactive solid.

38. The groundwater treatment system of claim 24, further comprising a packer operationally separating the inlet portion and the outlet portion.

39. The groundwater treatment system of claim 38, wherein the inlet portion and outlet portion share a common screen that is operationally segmented by the packer.

40. A subterranean groundwater treatment system, comprising:

a well casing laterally defining a treatment portion, an outlet portion, and an inlet portion, wherein the treatment portion is separate from and nearer to ground level than the inlet portion or the outlet portion, and wherein the cross-sectional area of the well casing defining the treatment portion is greater than the cross-sectional area of the well casing defining the inlet portion or outlet portion, and wherein the inlet and outlet portion are separated and sealed from one another;

a replaceable treatment media loaded into the treatment portion and configured to treat contaminated groundwater without forming a suspended slurry;

a pumping system configured to move water collected from an aquifer at the inlet portion to the treatment portion, then through the treatment media at the treatment portion, and then to the outlet portion for reintroduction to the aquifer;

wherein the groundwater treatment system is configured to be selectively sealed from atmosphere, and wherein the groundwater treatment system keeps the water below ground level for all aspects of treatment.

41. The groundwater treatment system of claim 40, wherein the treatment portion has a toroidal shape concentrically aligned above the inlet and outlet portions.

42. The groundwater treatment system of claim 40, further comprising a packer operationally separating the inlet portion and the outlet portion.

43. The groundwater treatment system of claim 42, wherein above ground expression of the groundwater treatment system is limited to an access positioned substantially at ground level.

\* \* \* \* \*